US012585897B2

(12) United States Patent
Guo et al.

(10) Patent No.: US 12,585,897 B2
(45) Date of Patent: **\*Mar. 24, 2026**

(54) OPERATION CIRCUIT AND CHIP

(71) Applicant: Shanghai Bright Power Semiconductor Co., Ltd., Shanghai (CN)

(72) Inventors: Yanmei Guo, Shanghai (CN); Zhen Zhu, Shanghai (CN); Yuehui Li, Shanghai (CN); Xiaoru Gao, Shanghai (CN); Yihui Chen, Shanghai (CN); Haifeng Miao, Shanghai (CN); Rulong Jiang, Shanghai (CN)

(73) Assignee: SHANGHAI BRIGHT POWER SEMICONDUCTOR CO., LTD., Shanghai (CN)

( \* ) Notice: Subject to any disclaimer, the term of this patent is extended or adjusted under 35 U.S.C. 154(b) by 896 days.

This patent is subject to a terminal disclaimer.

(21) Appl. No.: 17/886,089

(22) Filed: Aug. 11, 2022

(65) Prior Publication Data

US 2023/0050386 A1     Feb. 16, 2023

(30) Foreign Application Priority Data

Aug. 12, 2021 (CN) .......................... 202110924388.4

(51) Int. Cl.
| | |
|---|---|
| *G06G 7/16* | (2006.01) |
| *H02J 7/00* | (2026.01) |
| *H02J 7/34* | (2006.01) |

(52) U.S. Cl.
CPC ............ *G06G 7/16* (2013.01); *H02J 7/00034* (2020.01); *H02J 7/00711* (2020.01); *H02J 7/345* (2013.01); *H02J 2207/50* (2020.01)

(58) Field of Classification Search
CPC ..................................................... H02J 2207/50
See application file for complete search history.

(56) References Cited

U.S. PATENT DOCUMENTS

| | | | | |
|---|---|---|---|---|
| 6,147,551 | A * | 11/2000 | Hong | G11C 27/024 327/554 |
| 6,816,104 | B1 * | 11/2004 | Lin | H03M 1/007 341/172 |
| 7,511,645 | B1 * | 3/2009 | Ranucci | H03M 1/1019 341/120 |
| 9,490,739 | B2 * | 11/2016 | Tsai | F04D 27/004 |

(Continued)

*Primary Examiner* — Tynese V Mcdaniel
(74) *Attorney, Agent, or Firm* — MUNCY, GEISSLER, OLDS & LOWE, P.C.

(57) ABSTRACT
An operation circuit and a chip pertaining to the field of integrated circuit design technology are disclosed by the present application. The circuit includes a capacitor charging/discharging module and an error amplification module electrically connected to the capacitor charging/discharging module. The capacitor charging/discharging module is configured to receive a first signal and a third signal that are external to the capacitor charging/discharging module and to output a feedback signal. The error amplification module is configured to receive the feedback signal and a second signal that is external to error amplification module and to output, based on the received feedback and second signals, a target signal to the capacitor charging/discharging module. In a steady state, values of the target, first, second and third signals satisfy a predefined mathematical relationship.

16 Claims, 2 Drawing Sheets

(56)         References Cited

U.S. PATENT DOCUMENTS

| | | | |
|---|---|---|---|
| 9,748,935 B2 * | 8/2017 | Kim | G06G 7/16 |
| 2008/0191795 A1 * | 8/2008 | Dharmalinggam | H03H 11/1291 |
| | | | 320/166 |
| 2009/0001946 A1 * | 1/2009 | Mehas | H02M 1/36 |
| | | | 323/266 |
| 2016/0065140 A1 * | 3/2016 | Sun | H03F 3/245 |
| | | | 330/251 |
| 2016/0181913 A1 * | 6/2016 | Feng | H02M 3/07 |
| | | | 327/536 |
| 2019/0253039 A1 * | 8/2019 | Sicurella | H03K 5/24 |
| 2022/0209662 A1 * | 6/2022 | Sun | H02M 1/0025 |
| 2022/0209673 A1 * | 6/2022 | Guo | H02M 3/158 |
| 2023/0034590 A1 * | 2/2023 | Cai | H05B 45/10 |
| 2023/0046618 A1 * | 2/2023 | Guo | H02J 7/00034 |
| 2023/0198395 A1 * | 6/2023 | Sun | H02M 1/0025 |
| | | | 323/282 |
| 2024/0039384 A1 * | 2/2024 | Lv | H02M 3/158 |
| 2024/0204761 A1 * | 6/2024 | Gupta | H03K 19/20 |
| 2025/0260312 A1 * | 8/2025 | Gupta | H02M 1/08 |

* cited by examiner

OPERATION CIRCUIT AND CHIP

CROSS-REFERENCE TO RELATED APPLICATION

This application claims the priority of Chinese patent application number 202110924388.4, filed on Aug. 12, 2021, the entire contents of which are incorporated herein by reference.

TECHNICAL FIELD

The present invention relates to the field of integrated circuit design technology and, in particular, to an operation circuit and a chip.

BACKGROUND

In the field of electronics, more and more applications involve A*B/C operations of electrical signals (where A, B or C may be a voltage signal or a current signal). For example, in some signal processing applications, or by the quick-charge PPS (Programmable Power Supply) protocol, constant-power functions are required. Power is voltage times current. An A*B/C operation may be conducted either by a digital circuit, or by an analog circuit.

In the digital circuit implementation, if A, B, C are analog signals, it is necessary to convert these analog signals to their digital representations using an analog-to-digital converter (A/D converter or ADC). Digital multipliers are based on the shift-and-add method. Digital dividers are based on subtraction and generally require complex hardware. Addition, subtraction or multiplication is easy for digital circuits, while division is particularly cumbersome for them.

Therefore, it is necessary to provide an operation circuit with simplicity.

SUMMARY OF THE INVENTION

The present invention provides an operation circuit and a chip in order to overcome the problem that existing digital circuits and hardware for multiplication and division operations are complex.

In a first aspect, the present invention provides an operation circuit comprising a capacitor charging/discharging module and an error amplification module electrically connected to the capacitor charging/discharging module, wherein:

the capacitor charging/discharging module is configured to: receive a first signal and a third signal that are external to the capacitor charging/discharging module, and output a feedback signal, the error amplification module is configured to: receive the feedback signal and a second signal that is external to the error amplification module, and output a target signal to the capacitor charging/discharging module based on the received feedback and second signals, wherein all of the first, second and third signals are analog signals, and wherein in a steady state, a value of the target signal, a value of the first signal, a value of the second signal and a value of the third signal satisfy a predefined mathematical relationship comprising a factor, the predefined mathematical relationship including a product of the value of the first signal and the value of the second signal divided by the value of the third signal.

In the operation circuit according to the present invention, the capacitor charging/discharging module may comprise a first capacitor charging/discharging sub-module and a second capacitor charging/discharging sub-module, wherein:

the first capacitor charging/discharging sub-module is configured to receive the first and third signals, and output a fourth signal based on the first and third signals;

the second capacitor charging/discharging sub-module is electrically connected to the first capacitor charging/discharging sub-module, and is configured to receive the fourth signal and the target signal output by the error amplification module and to output the feedback signal based on the fourth and target signals;

and the error amplification module is electrically connected to the second capacitor charging/discharging sub-module and is configured to calculate an error between the feedback and second signals and to output the target signal.

In the operation circuit according to the present invention, the first capacitor charging/discharging sub-module may comprise a first capacitor, a first switch and a first comparator; and the second capacitor charging/discharging sub-module may comprise a second capacitor, a third capacitor, a second switch, a third switch and a fourth switch, wherein a first terminal of the first switch, a first terminal of the first capacitor and a negative input terminal of the first comparator are electrically connected to an output terminal of the first current source to receive the first signal, a second terminal of the first switch and a second terminal of the first capacitor being grounded, wherein: a positive input terminal of the first comparator is configured to receive the third signal, and an output terminal of the first comparator is electrically connected to a control terminal of the second switch to switch the second switch on/off; a first terminal of the second switch is electrically connected to an output terminal of a second current source, and a second terminal of the second switch is electrically connected to each of a first terminal of the third switch, a first terminal of the second capacitor and a first terminal of the fourth switch; a second terminal of the fourth switch is electrically connected to a first terminal of the third capacitor and a negative input terminal of the error amplification module; and a second terminal of the third switch, a second terminal of the second capacitor and a second terminal of the third capacitor are ground, wherein a positive input terminal of the error amplification module is configured to receive the second signal, and an output terminal of the error amplification module is electrically connected to the first terminal of the second switch.

In the operation circuit according to the present invention, the first capacitor charging/discharging sub-module may further comprise a first pulse source and the second capacitor charging/discharging sub-module may further comprise a second pulse source, wherein a control terminal of the first switch and a control terminal of the third switch are coupled to the first pulse source to receive a first pulse at a fixed frequency generated by the first pulse source to switch on/off the first and third switches, wherein a control terminal of the fourth switch is coupled to the second pulse source to receive a second pulse at a fixed frequency generated by the second pulse source to switch on/off the fourth switch, and wherein a plurality of rising edges of the second pulse are aligned with a plurality of falling edges of the fourth signal.

In the operation circuit according to the present invention, the first switch may be configured to discharge the first capacitor within a first preset period, wherein a capacitance of the second capacitor is normally proportional to a capacitance of the first capacitor, wherein the third switch is configured to discharge the second capacitor within a second preset period, wherein the fourth signal output from the first comparator controls a charging duration of the second capacitor by switching the second switch on/off, wherein the fourth switch and the third capacitor form a peak voltage sampling circuit, and wherein a capacitance of the third capacitor is much smaller than the capacitance of the second capacitor, and wherein the error amplification module comprises an OTA (Operational Transconductance Amplifier).

In the operation circuit according to the present invention, the value of the target signal may be normally proportional to a product of the value of the first signal, the capacitance of the second capacitor and the value of the second signal divided by a product of the capacitance of the first capacitor and the value of the third signal.

In the operation circuit according to the present invention, the second capacitor charging/discharging sub-module may further comprise a second current source with an output terminal electrically connected to the first terminal of the second switch.

In the operation circuit according to the present invention, a sum of a value of the second current source and the value of the target signal may be normally proportional to a product of the value of the first signal, the capacitance of the second capacitor and the value of the second signal divided by a product of the capacitance of the first capacitor and the value of the third signal.

In a second aspect, the present invention also provides a chip comprising an operation circuit, wherein the operation circuit comprises a capacitor charging/discharging module and an error amplification module electrically connected to the capacitor charging/discharging module, wherein:

the capacitor charging/discharging module is configured to: receive a first signal and a third signal that are external to the capacitor charging/discharging module, and output a feedback signal;

the error amplification module is configured to: receive the feedback signal and a second signal that is external to the error amplification module, and output a target signal to the capacitor charging/discharging module based on the received feedback and second signals, wherein all of the first, second and third signals are analog signals, and wherein in a steady state, a value of the target signal, a value of the first signal, a value of the second signal and a value of the third signal satisfy a predefined mathematical relationship comprising a factor, the predefined mathematical relationship including a product of the value of the first signal and the value of the second signal divided by the value of the third signal.

In the chip according to the present invention, the capacitor charging/discharging module may comprise a first capacitor charging/discharging sub-module and a second capacitor charging/discharging sub-module, wherein:

the first capacitor charging/discharging sub-module is configured to receive the first and third signals, and output a fourth signal based on the first and third signals;

the second capacitor charging/discharging sub-module is electrically connected to the first capacitor charging/discharging sub-module, and is configured to receive the fourth signal and the target signal output by the error amplification module and to output the feedback signal based on the fourth and target signals;

and the error amplification module is electrically connected to the second capacitor charging/discharging sub-module and is configured to calculate an error between the feedback and second signals and to output the target signal.

In the chip according to the present invention, the first capacitor charging/discharging sub-module may comprise a first capacitor, a first switch and a first comparator; and the second capacitor charging/discharging sub-module may comprise a second capacitor, a third capacitor, a second switch, a third switch and a fourth switch, wherein a first terminal of the first switch, a first terminal of the first capacitor and a negative input terminal of the first comparator are electrically connected to an output terminal of the first current source to receive the first signal, a second terminal of the first switch and a second terminal of the first capacitor being grounded, wherein: a positive input terminal of the first comparator is configured to receive the third signal, and an output terminal of the first comparator is electrically connected to a control terminal of the second switch to switch the second switch on/off; a first terminal of the second switch is electrically connected to an output terminal of a second current source, and a second terminal of the second switch is electrically connected to each of a first terminal of the third switch, a first terminal of the second capacitor and a first terminal of the fourth switch; a second terminal of the fourth switch is electrically connected to a first terminal of the third capacitor and a negative input terminal of the error amplification module; and a second terminal of the third switch, a second terminal of the second capacitor and a second terminal of the third capacitor are ground, wherein a positive input terminal of the error amplification module is configured to receive the second signal, and an output terminal of the error amplification module is electrically connected to the first terminal of the second switch.

In the chip according to the present invention, the first capacitor charging/discharging sub-module may further comprise a first pulse source and the second capacitor charging/discharging sub-module may further comprise a second pulse source, wherein a control terminal of the first switch and a control terminal of the third switch are coupled to the first pulse source to receive a first pulse at a fixed frequency generated by the first pulse source to switch on/off the first and third switches, wherein a control terminal of the fourth switch is coupled to the second pulse source to receive a second pulse at a fixed frequency generated by the second pulse source to switch on/off the fourth switch, and wherein a plurality of rising edges of the second pulse are aligned with a plurality of falling edges of the fourth signal.

In the operation circuit according to the present invention, the first switch may be configured to discharge the first capacitor within a first preset period, wherein a capacitance of the second capacitor is normally proportional to a capacitance of the first capacitor, wherein the third switch is configured to discharge the second capacitor within a second preset period, wherein the fourth signal output from the first comparator controls a charging duration of the second capacitor by switching the second switch on/off, wherein the fourth switch and the third capacitor form a peak voltage sampling circuit, and wherein a capacitance of the third capacitor is much smaller than the capacitance of the second capacitor, and wherein the error amplification module comprises an OTA.

In the chip according to the present invention, the value of the target signal may be normally proportional to a product of the value of the first signal, the capacitance of the second capacitor and the value of the second signal divided by a product of the capacitance of the first capacitor and the value of the third signal.

In the chip according to the present invention, the second capacitor charging/discharging sub-module may further comprise a second current source with an output terminal electrically connected to the first terminal of the second switch.

In the chip according to the present invention, a sum of a value of the second current source and the value of the target signal may be normally proportional to a product of the value of the first signal, the capacitance of the second capacitor and the value of the second signal divided by a product of the capacitance of the first capacitor and the value of the third signal.

In the operation circuit and chip proposed in the present invention, with the capacitor charging/discharging module and the error amplification module, multiplication and division operations of electrical signals can be easily performed using stepwise approximation. The operation chip can be flexibly used in various circuits.

BRIEF DESCRIPTION OF THE DRAWINGS

In order to more clearly explain embodiments of the present invention or the prior art, the accompanying drawings, to which reference is to be made in connection with the following description of the embodiments or the prior art, will be briefed below. Apparently, these drawings show only some embodiments of the invention, and those of ordinary skill in the art can obtain other drawings in light of those contained herein, without paying any creative effort.

DETAILED DESCRIPTION

Embodiments of the present invention will be described clearly and fully hereunder in conjunction with the appended drawings so that objects, aspects and advantages of the invention will become more apparent. Evidently, the embodiments set forth herein are merely some but not all possible embodiments of this invention. Any and all other embodiments devisable by skilled artisans in light of the disclosed embodiments without paying any creative effort are considered to fall within the scope of protection of this invention.

The terms "first," "second," and the like in the description, claims and drawings of this application are used for distinguishing between similar elements and not necessarily for describing a particular sequential or chronological order. It is to be understood that the terms so used are interchangeable under appropriate circumstances such that the embodiments described herein are capable of operation in sequences other than those illustrated or otherwise described herein.

In order to overcome the problem that existing digital circuits and hardware for multiplication operation and division operation are complex, the present invention provides an operation circuit which can readily perform the multiplication and division operations of electrical signals simply using a capacitor charging/discharging module and an error amplification module.

The operation circuit and chip proposed in the present invention will be described below with reference to FIGS. 1 to 5.

Figure 1:
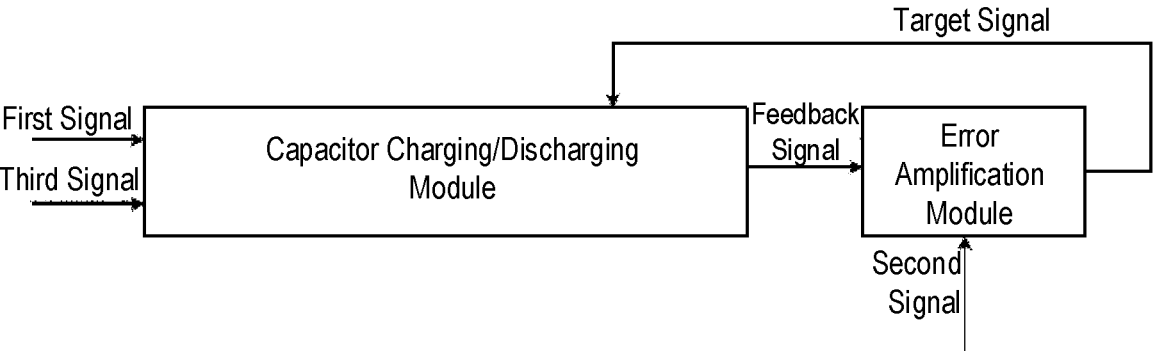
FIG. 1 is a schematic diagram of an operation circuit according to a first embodiment in the present invention.

FIG. 1 is a schematic diagram of the operation circuit according to a first embodiment proposed in the present invention. As shown in FIG. 1, the operation circuit proposed in the present invention includes a capacitor charging/discharging module and an error amplification module electrically connected to the capacitor charging/discharging module.

The capacitor charging/discharging module is configured to receive the first signal and the third signal that are external to the capacitor charging/discharging module, and to output a feedback signal.

The error amplification module is configured to receive the feedback signal and the second signal that is external to the error amplification module and to output, based on the feedback signal and the second signal, a target signal to the capacitor charging/discharging module.

The first, second and third signals are all analog signals. In a steady state, values of the target, first, second and third signals would satisfy a predefined mathematical relationship comprising a factor, wherein the value of the target signal is a result obtained by dividing a product of the value of the first signal and the value of the second signal by the value of the third signal, i.e., Target Signal=First Signal*Second Signal/Third Signal.

Embodiment

Figure 2:
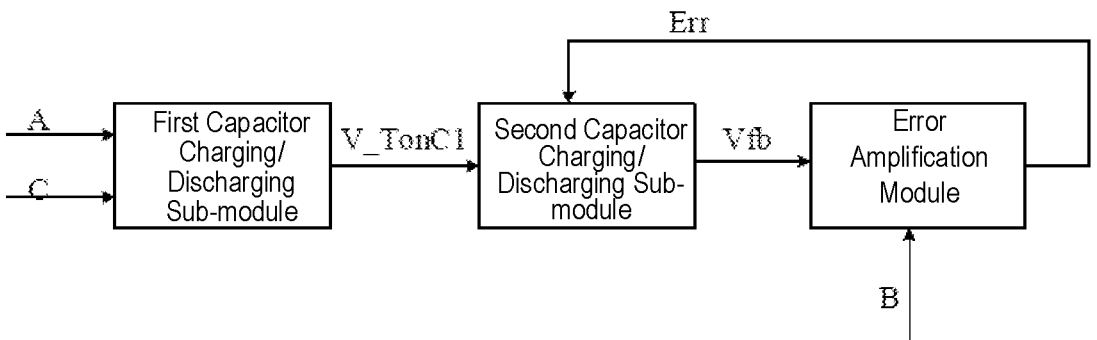
FIG. 2 is a schematic diagram of an operation circuit according to a second embodiment in the present invention.

FIG. 2 is a schematic diagram of an operation circuit according to a second embodiment proposed in the present invention. As shown in FIG. 2, the operation circuit includes a capacitor charging/discharging module and an error amplification module. The capacitor charging/discharging module includes a first capacitor charging/discharging sub-module and a second capacitor charging/discharging sub-module.

The first capacitor charging/discharging sub-module is configured to receive the first signal A and the third signal C that are external to the first capacitor charging/discharging sub-module, and to output a fourth signal V_TonC1 based on the first signal A and the third signal C. The fourth signal V_TonC1 comprises information of the first signal A and the third signal C.

The second capacitor charging/discharging sub-module is electrically connected to the first capacitor charging/discharging sub-module and is configured to receive the fourth signal V_TonC1 and a target signal Err output from the error amplification module, and to output a feedback signal Vfb based on the fourth signal V_TonC1 and the target signal Err.

The error amplification module is electrically connected to the second capacitor charging/discharging sub-module and is configured to calculate an error between the feedback signal Vfb and the second signal B, and to output the target signal Err.

In a steady state, the value of the target signal is proportional to the product of the value of the first signal A and the value of the second signal B divided by the value of the third signal C, i.e., $$\text{Target Signal} = K*A*B/C,$$

where K is a preset proportional factor. In implementations, the factor is determined by the size of a capacitor or current source. Additionally, K may be modified or adjusted by the target signal Err.

It is to be noted that in Embodiment of the present invention, the error amplification module is disposed downstream of the second capacitor charging/discharging sub-module. The target signal is output by the operation circuit of the present invention.

Specific circuit implementations of Embodiment, including Implementation 1 and Implementation 2 below, will be described.

Figure 3:
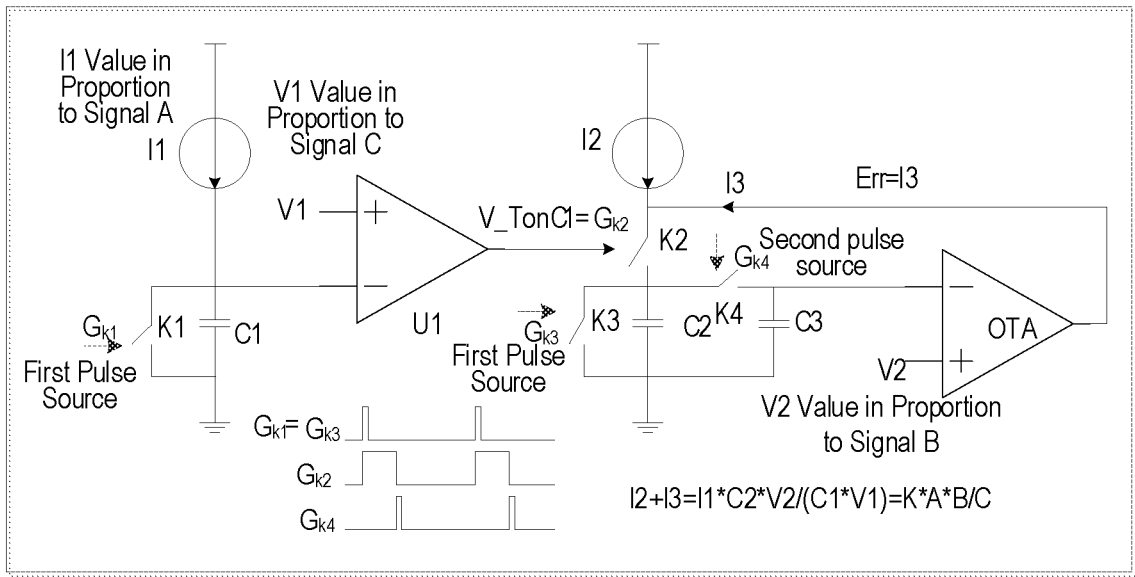
FIG. 3 is a schematic circuit diagram of an exemplary implementation of FIG. 2.

Implementation 1:

FIG. 3 is a schematic circuit diagram of an Implementation of FIG. 2.

As shown in FIG. 3, the first capacitor charging/discharging sub-module includes a first capacitor C1, a first switch K1 and a first comparator U1. The second capacitor charging/discharging sub-module includes a second current source I2, a second capacitor C2, a third capacitor C3, a second switch K2, a third switch K3 and a fourth switch K4. The error amplification module is composed of an OTA (Operational Transimpedance Amplifier).

A first terminal of the first switch K1, a first terminal of the first capacitor C1 and a negative (−) input terminal of the first comparator U1 are electrically connected to an output terminal of the first current source I1 so as to be able to receive the first signal A. A second terminal of the first switch A and a second terminal of the first capacitor C1 are grounded.

A positive (+) input terminal of the first comparator U1 is configured to receive the third signal C, and its output terminal is electrically connected to a control terminal of the second switch K2 so as to be able to switch the second switch K2 on/off. A first terminal of the second switch K2 is electrically connected to an output terminal of the second current source I2. A second terminal of the second switch K2 is electrically connected to each of a first terminal of the third switch K3, a first terminal of the second capacitor C2 and a first terminal of the fourth switch K4. A second terminal of the fourth switch K4 is electrically connected to a first terminal of the third capacitor C3. A second terminal of the fourth switch K4 is electrically connected to both the first terminal of the third capacitor C3 and a negative (−) input terminal of the error amplification module OTA. A second terminal of the third switch K3, a second terminal of the second capacitor C2 and a second terminal of the third capacitor C3 are all grounded.

A positive (+) input terminal of the error amplification module is configured to receive the second signal B external to the error amplification module, and an output terminal of the error amplification module (from which the target signal Err is output in the form of a current I3) is electrically connected to the first terminal of the second switch K2, which is in turn electrically connected to the output terminal of the second current source I2. Drive signals for the aforementioned first to fourth switches (K1-K4) are respectively denoted by $G_{k1}$, $G_{k2}$, $G_{k3}$ and $G_{k4}$.

Optionally, the first capacitor charging/discharging sub-module further includes a first pulse source, and the second capacitor charging/discharging sub-module further includes a second pulse source. In this case, the drive signals $G_{k1}$, $G_{k3}$ are output from the first pulse source, $G_{k4}$ from the second pulse source, and $G_{k2}$ from the aforementioned fourth signal V_TonC1.

A control terminal of the first switch K1 and a control terminal of the third switch K3 are connected to the first pulse source, which provides the drive signal $G_{k1}$, $G_{k3}$ at a fixed frequency to the first switch K1 and the third switch K3, respectively, to switch on/off the first switch K1 and the third switch K3. A control terminal of the fourth switch K4 is coupled to the second pulse source, which provides the drive signal $G_{k4}$ to switch on/off the fourth switch K4.

In the above implementation, an output current of the first current source I1 is proportional to a current of the first signal A, and a voltage V1 at the positive input of the first comparator U1 is proportional to a voltage of the third signal C. Moreover, a voltage V2 at the positive (+) input terminal of the error amplification module OTA is proportional to a voltage of the second signal B.

In the above implementation, the drive signal $G_{k1}$ for the first switch K1 is a first pulse at a fixed frequency fs. The drive signal G is a second pulse. See the waveform in FIG. 3, where $G_{k1}$=$G_{k3}$ represents the first pulse, and the drive pulse $G_{k2}$ for the second switch is wider than the first and second pulses. $G_{k1}$ functions to discharge the first capacitor C1 to 0 V within a first preset period. The fourth signal V_TonC1 is output from the first comparator U1 and comprises information of the first signal A and the third signal C. The fourth signal V_TonC1 is maintained at high level for a period of V1*C1/I1, and a duty cycle of this high level is normally proportional to V1/I1 (i.e., C/A).

In the above implementation, a capacitance of the second capacitor C2 is normally proportional to a capacitance of the first capacitor C1 (i.e., C2 is proportional to C1), and the drive signal for the third switch K3 satisfies $G_{k3}$=$G_{k1}$. $G_{k3}$ functions to discharge the second capacitor C2 to 0 V within a second preset period. A voltage of the drive signal $G_{k2}$ for the second switch K2 is equal to a voltage of the fourth signal V_TonC1, i.e., $G_{k2}$=V_TonC1. $G_{k2}$ functions to control a charging duration of the second capacitor C2.

In the above implementation, $G_{k4}$ and C3 form a peak voltage sampling circuit, wherein a capacitance of the third capacitor C3 is much smaller than the capacitance of the second capacitor C2, i.e., C3≪C2. The drive signal $G_{k4}$ for the fourth switch K4 comprises rising edges aligned with falling edges of the fourth signal V_TonC1 as shown in the waveform diagram of FIG. 3. A voltage across the third capacitor C3 is equal to a voltage of the feedback signal, i.e., $V_{C3}$=Vfb.

Optionally, the error amplification module includes an error amplifier OTA.

In the above arrangement, the OTA outputs a third current I3 which is equal to a current of the target signal Err.

In a steady state, the voltage $V_{C3}$ across the third capacitor C3 is equal to the voltage V2 at the positive (+) input terminal of the error amplification module OTA. That is, $V_{C3}$=V2, and $$V1*C1/I1 = V2*C2/(I2+I3).$$

Therefore, the sum of a current from the second current source I2 and a current from the third current I3 is proportional to the product of the current of the first signal A, the capacitance of the second capacitor C2 and the voltage V2 of the second signal B divided by the product of the capacitance of the first capacitor C1 and the voltage of the third signal C, i.e., $$I2+I3 = I1*C2*V2/(V1*C1) = K*A*B/C.$$

In other words, the sum of the current from of the second current source I2 and the current from the third current I3 is proportional to the product of the current represented by the first signal A and the voltage represented by the second signal B divided by the voltage represented by the third signal C, i.e., $$I2+I3=K*A*B/C,$$

where K is a proportional factor.

Figure 4:
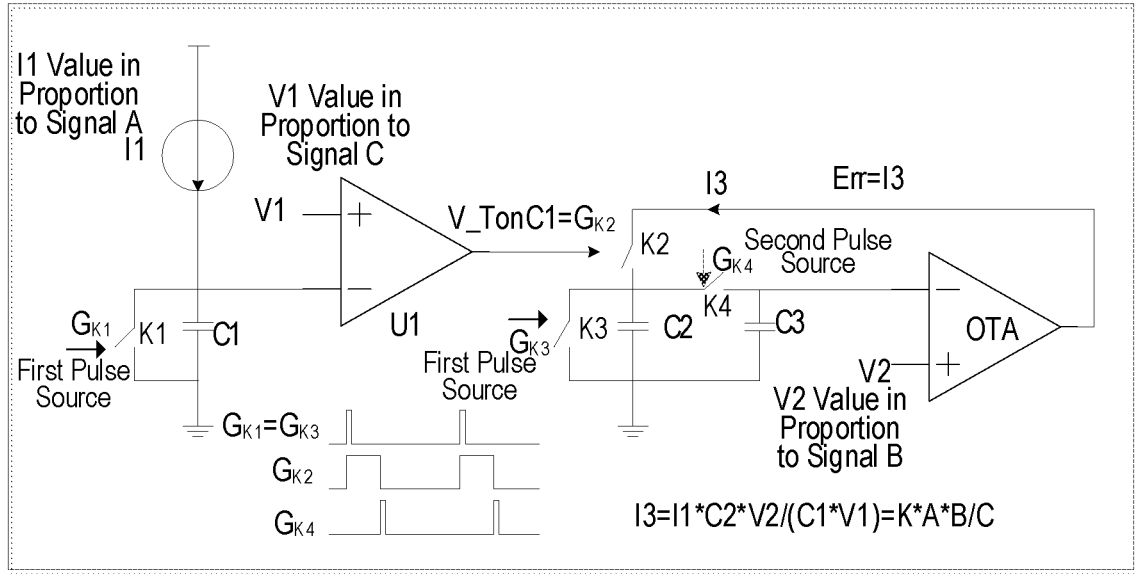
FIG. 4 is a schematic circuit diagram of another exemplary implementation of FIG. 2.

Implementation 2:

FIG. 4 is a schematic circuit diagram is another Implementation of FIG. 2.

As shown in FIG. 4, the first capacitor charging/discharging sub-module includes a first capacitor C1, a first switch K1 and a first comparator U1. The second capacitor charging/discharging sub-module includes a second capacitor C2, a third capacitor C3, a second switch K2, a third switch K3 and a fourth switch K4. The error amplification module is composed of an OTA (Operational Transimpedance Amplifier).

A first terminal of the first switch K1, a first terminal of the the first capacitor C1 and a negative (−) input terminal of the first comparator U1 is electrically connected to an output terminal of the first current source I1 so as to be able to receive the first signal A. A second terminal of the first switch A and a second terminal of the first capacitor C1 are grounded.

A positive (+) input terminal of the first comparator U1 is configured to receive the third signal C, and its output terminal is electrically connected to a control terminal of the second switch K2 so as to be able to switch the second switch K2 on/off. A second terminal of the second switch K2 is electrically connected to each of a first terminal of the third switch K3, a first terminal of the second capacitor C2 and a first terminal of the fourth switch K4, and a second terminal of the fourth switch K4 is electrically connected to a first terminal of the third capacitor C3. The second terminal of the fourth switch K4 is electrically connected to both the first terminal of the third capacitor C3 and a negative (−) input terminal of the error amplification module. A second terminal of the third switch K3, a second terminal of the second capacitor C2 and a second terminal of the third capacitor C3 are grounded.

A positive (+) input terminal of the error amplification module is configured to receive a second signal B external to the error amplification module, and an output terminal of the error amplification module (from which the target signal Err is output in the form of a current I3) is electrically connected to the first terminal of the second switch K2. Drive signals for the aforementioned first to fourth switches (K1–K4) are respectively denoted by $G_{k1}$, $G_{k2}$, $G_{k3}$ and $G_{k4}$.

Optionally, the first capacitor charging/discharging sub-module further includes a first pulse source, and the second capacitor charging/discharging sub-module further includes a second pulse source. In this case, the drive signals $G_{k1}$, $G_{k3}$ are output from the first pulse source, $G_{k4}$ from the second pulse source, and $G_{k2}$ form the aforementioned fourth signal V_TonC1.

Control terminals of the first switch K1 and the third switch K3 are connected to the first pulse source, which provides the drive signal $G_{k1}$, $G_{k3}$ at a fixed frequency to the first switch K1 and the third switch K3, respectively, to switch on/off the first switch K1 and the third switch K3. A control terminal of the fourth switch K4 is coupled to the second pulse source, which provides the drive signal $G_{k4}$ to switch on/off the fourth switch K4.

In the implementation 2, a current output from the first current source I1 is proportional to a current of the first signal A, and a voltage V1 at the positive input of the third comparator U1 is proportional to a voltage of the third signal C. Moreover, a voltage V2 at the positive (+) input terminal of the error amplification module OTA is proportional to a voltage of the second signal B.

In the implementation 2, the drive signal $G_{k1}$ for the first switch K1 is a first pulse at a fixed frequency fs. The drive signal $G_{k4}$ is a second pulse. See waveforms in FIG. 4, where $G_{k1}=G_{k3}$ represents the first pulses, and the drive pulse $G_{k2}$ for the second switch is wider than the first and second pulses. $G_{k1}$ functions to discharge the first capacitor C1 to 0 V within a first preset period. The fourth signal V_TonC1 is output from the first comparator U1 and comprises information of the first signal A and the third signal C. The fourth signal V_TonC1 is maintained at high level for a period of V1*C1/I1, and a duty cycle of this high level is normally proportional to V1/I1 (i.e., C/A).

In the implementation 2, a capacitance of the second capacitor C2 is normally proportional to a capacitance of the first capacitor C1 (i.e., C2 is proportional to C1), and the drive signal for the third switch K3 satisfies $G_{k3}=G_{k3}$. $G_{k3}$ functions to discharge the second capacitor C2 to 0 V within a second preset period. A voltage of the drive signal $G_{k2}$ for the second switch K2 is equal to a voltage of the fourth signal V_TonC1, i.e., $G_{k2}=V\_TonC1$. $G_{k2}$ functions to control a charging duration of the second capacitor C2.

In the implementation 2, $G_{k4}$ and C3 form a peak voltage sampling circuit, wherein a capacitance of the third capacitor C3 is much smaller than the capacitance of the second capacitor C2, i.e., C3≪C2. The drive signal $G_{k4}$ for the fourth switch K4 comprises rising edges aligned with falling edges of the drive pulse $G_{k2}$ for the second switch K2 as shown in the waveform diagram of FIG. 4. A voltage across the third capacitor C3 is equal to a voltage of the feedback signal, i.e., $V_{C3}=Vfb$.

In the implementation 2, the error amplification module outputs a third current I3 which represents the target signal Err.

In a steady state, the voltage $V_{C3}$ across the third capacitor C3 is equal to the voltage V2 at the positive (+) input terminal of the error amplification module OTA. That is, $$V_{C3}=V2,$$

and $$V1*C1/I1=V2*C2/I3.$$

Therefore, the third current I3 is equal to the product of the current of the first signal A, the value of the second capacitor C2 and the voltage V2 of the second signal B divided by the product of the capacitance of the first capacitor C1 and the voltage of the third signal C, i.e., $$I3 \sim I1*C2*V2/(V1*C1)=K*A*B/C.$$

In other words, the third current I3 is equal to a product of K, the current of the first signal A and the voltage of the second signal B divided by the voltage of the third signal C, i.e., $$I3=K*A*B/C,$$

where K is a preset factor.

Implementation 2 differs from Implementation 1 in that the second current source I2 is omitted in Implementation 2 in comparison to Implementation 1.

Thus, the circuits of Implementations 1 and Implementation 2 can readily implement the operation circuit of the present invention.

Figure 5:
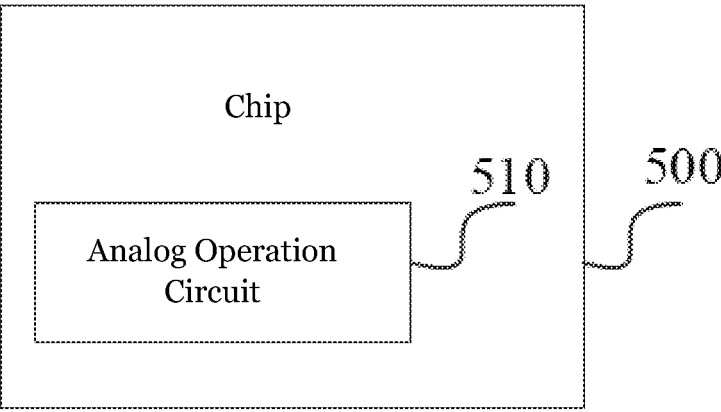
FIG. 5 is a schematic diagram of a chip proposed in the present invention.

FIG. 5 is a schematic diagram of the chip proposed in the present invention. As shown in FIG. 5, the chip 500 of the present invention includes the operation circuit 510 as defined above.

Reference can be made to the above description for structural details of the operation circuit 510, and a further description thereof is omitted here.

Through implementation of the operation circuit 510, the chip 500 can be suitably used in more electronics applications for multiplication and division operations of electrical signals.

Finally, it is to be noted that the foregoing embodiments are provided merely to illustrate the present invention and are not intended to limit it in any sense. Although the present invention has been described in detail with reference to the above embodiments, those of ordinary skill in the art will appreciate that modifications to those embodiments are still possible, or all or some of the technical features thereof can be equivalently substituted, without causing the essence of them to depart from the scope of the various embodiments of the present invention.

What is claimed is:

1. An operation circuit, comprising: a capacitor charging/discharging module and an error amplification module electrically connected to the capacitor charging/discharging module, wherein:

the capacitor charging/discharging module is configured to: receive a first signal and a third signal that are external to the capacitor charging/discharging module, and output a feedback signal;

the error amplification module is configured to: receive the feedback signal and a second signal that is external to the error amplification module, and output a target signal to the capacitor charging/discharging module based on the received feedback and the second signal, wherein all of the first, second and third signals are analog signals, and wherein in a steady state, a value of the target signal, a value of the first signal, a value of the second signal and a value of the third signal satisfy a predefined mathematical relationship comprising a factor, the predefined mathematical relationship including a product of the value of the first signal and the value of the second signal divided by the value of the third signal.

2. The operation circuit according to claim 1, wherein the capacitor charging/discharging module comprises a first capacitor charging/discharging sub-module and a second capacitor charging/discharging sub-module, wherein:

the first capacitor charging/discharging sub-module is configured to: receive the first and third signals, and output a fourth signal based on the first and third signals;

the second capacitor charging/discharging sub-module is electrically connected to the first capacitor charging/discharging sub-module, and is configured to receive the fourth signal and the target signal output by the error amplification module and to output the feedback signal based on the fourth and target signals;

the error amplification module is electrically connected to the second capacitor charging/discharging sub-module and is configured to calculate an error between the feedback and second signals and to output the target signal.

3. The operation circuit according to claim 2, wherein: the first capacitor charging/discharging sub-module comprises a first capacitor, a first switch and a first comparator; and the second capacitor charging/discharging sub-module comprises a second capacitor, a third capacitor, a second switch, a third switch and a fourth switch, wherein a first terminal of the first switch, a first terminal of the first capacitor and a negative input terminal of the first comparator are electrically connected to an output terminal of a current source to receive the first signal, a second terminal of the first switch and a second terminal of the first capacitor being grounded, wherein: a positive input terminal of the first comparator is configured to receive the third signal, and an output terminal of the first comparator is electrically connected to a control terminal of the second switch to switch the second switch on/off; a first terminal of the second switch is electrically connected to an output terminal of a second current source, and a second terminal of the second switch is electrically connected to each of a first terminal of the third switch, a first terminal of the second capacitor and a first terminal of the fourth switch; a second terminal of the fourth switch is electrically connected to a first terminal of the third capacitor and a negative input terminal of the error amplification module; a second terminal of the third switch, a second terminal of the second capacitor and a second terminal of the third capacitor are ground, wherein a positive input terminal of the error amplification module is configured to receive the second signal, and an output terminal of the error amplification module is electrically connected to the first terminal of the second switch.

4. The operation circuit according to claim 3, wherein the first capacitor charging/discharging sub-module further comprises a first pulse source, and the second capacitor charging/discharging sub-module further comprises a second pulse source, wherein a control terminal of the first switch and a control terminal of the third switch are coupled to the first pulse source to receive a first pulse at a fixed frequency generated by the first pulse source to switch on/off the first and third switches, wherein a control terminal of the fourth switch is coupled to the second pulse source to receive a second pulse at a fixed frequency generated by the second pulse source to switch on/off the fourth switch, and wherein a plurality of rising edges of the second pulse are aligned with a plurality of falling edges of the fourth signal.

5. The operation circuit according to claim 4, wherein the first switch is configured to discharge the first capacitor within a first preset period, wherein a capacitance of the second capacitor is proportional to a capacitance of the first capacitor, wherein the third switch is configured to discharge the second capacitor within a second preset period, wherein the fourth signal output from the first comparator controls a charging duration of the second capacitor by switching the second switch on/off, wherein the fourth switch and the third capacitor form a peak voltage sampling circuit, and wherein a capacitance of the third capacitor is much smaller than the capacitance of the second capacitor, and wherein the error amplification module comprises an OTA.

6. The operation circuit according to claim 5, wherein the value of the target signal is normally proportional to a product of the value of the first signal, the value of the second capacitor and the value of the second signal divided by a product of the value of the first capacitor and the value of the third signal.

7. The operation circuit according to claim 5, wherein the second capacitor charging/discharging sub-module further comprises a second current source with an output terminal electrically connected to the first terminal of the second switch.

8. The operation circuit according to claim 7, wherein a sum of a value of the second current source and the value of the target signal is normally proportional to a product of the value of the first signal, the capacitance of the second capacitor and the value of the second signal divided by a product of the capacitance of the first capacitor and the value of the third signal.

9. A chip comprising an operation circuit, wherein the operation circuit comprises a capacitor charging/discharging module and an error amplification module electrically connected to the capacitor charging/discharging module, wherein:

the capacitor charging/discharging module is configured to: receive a first signal and a third signal that are external to the capacitor charging/discharging module, and output a feedback signal;

the error amplification module is configured to: receive the feedback signal and a second signal that is external to the error amplification module, and output a target signal to the capacitor charging/discharging module based on the received feedback and second signals, wherein all of the first, second and third signals are analog signals, and wherein in a steady state, a value of the target signal, a value of the first signal, a value of the second signal and a value of the third signal satisfy a predefined mathematical relationship comprising a factor, the predefined mathematical relationship including a product of the value of the first signal and the value of the second signal divided by the value of the third signal.

10. The chip according to claim 9, wherein the capacitor charging/discharging module comprises a first capacitor charging/discharging sub-module and a second capacitor charging/discharging sub-module, wherein:

the first capacitor charging/discharging sub-module is configured to: receive the first and third signals, and output a fourth signal based on the first and third signals;

the second capacitor charging/discharging sub-module is electrically connected to the first capacitor charging/discharging sub-module, and is configured to receive the fourth signal and the target signal output by the error amplification module and to output the feedback signal based on the fourth and target signals;

the error amplification module is electrically connected to the second capacitor charging/discharging sub-module and is configured to calculate an error between the feedback and second signals and to output the target signal.

11. The chip according to claim 10, wherein: the first capacitor charging/discharging sub-module comprises a first capacitor, a first switch and a first comparator; and the second capacitor charging/discharging sub-module comprises a second capacitor, a third capacitor, a second switch, a third switch and a fourth switch, wherein a first terminal of the first switch, a first terminal of the first capacitor and a negative input terminal of the first comparator are electrically connected to an output terminal of a first current source to receive the first signal, a second terminal of the first switch and a second terminal of the first capacitor being grounded, wherein: a positive input terminal of the first comparator is configured to receive the third signal, and an output terminal of the first comparator is electrically connected to a control terminal of the second switch to switch the second switch on/off; a first terminal of the second switch is electrically connected to an output terminal of a second current source, and a second terminal of the second switch is electrically connected to each of a first terminal of the third switch, a first terminal of the second capacitor and a first terminal of the fourth switch; a second terminal of the fourth switch is electrically connected to a first terminal of the third capacitor and a negative input terminal of the error amplification module; a second terminal of the third switch, a second terminal of the second capacitor and a second terminal of the third capacitor are ground, wherein a positive input terminal of the error amplification module is configured to receive the second signal, and an output terminal of the error amplification module is electrically connected to the first terminal of the second switch.

12. The chip according to claim 11, wherein the first capacitor charging/discharging sub-module further comprises a first pulse source, and the second capacitor charging/discharging sub-module further comprises a second pulse source, wherein a control terminal of the first switch and a control terminal of the third switch are coupled to the first pulse source to receive a first pulse at a fixed frequency generated by the first pulse source to switch on/off the first and third switches, wherein a control terminal of the fourth switch is coupled to the second pulse source to receive a second pulse at a fixed frequency generated by the second pulse source to switch on/off the fourth switch, and wherein a plurality of rising edges of the second pulse are aligned with a plurality of falling edges of the fourth signal.

13. The chip according to claim 12, wherein the first switch is configured to discharge the first capacitor within a first preset period, wherein a capacitance of the second capacitor is normally proportional to a capacitance of the first capacitor, wherein the third switch is configured to discharge the second capacitor within a second preset period, wherein the fourth signal output from the first comparator controls a charging duration of the second capacitor by switching the second switch on/off, wherein the fourth switch and the third capacitor form a peak voltage sampling circuit, and wherein a capacitance of the third capacitor is much smaller than the capacitance of the second capacitor, and wherein the error amplification module comprises an OTA.

14. The chip according to claim 13, wherein the value of the target signal is normally proportional to a product of the value of the first signal, the capacitance of the second capacitor and the value of the second signal divided by a product of the capacitance of the first capacitor and the value of the third signal.

15. The chip according to claim 14, wherein the second capacitor charging/discharging sub-module further comprises a second current source with an output terminal electrically connected to the first terminal of the second switch.

16. The chip according to claim 15, wherein a sum of a value of the second current source and the value of the target signal is normally proportional to a product of the value of the first signal, the capacitance of the second capacitor and the value of the second signal divided by a product of the capacitance of the first capacitor and the value of the third signal.

* * * * *